United States Patent
Gravesen et al.

(10) Patent No.: US 7,481,120 B2
(45) Date of Patent: Jan. 27, 2009

(54) TACTILE SENSOR ELEMENT AND SENSOR ARRAY

(75) Inventors: Peter Gravesen, Nordborg (DK); Mohamed Yahia Benslimane, Nordborg (DK)

(73) Assignee: Danfoss A/S, Nordborg (DK)

( * ) Notice: Subject to any disclaimer, the term of this patent is extended or adjusted under 35 U.S.C. 154(b) by 80 days.

(21) Appl. No.: 10/538,260

(22) PCT Filed: Dec. 10, 2003

(86) PCT No.: PCT/DK03/00848

§ 371 (c)(1),
(2), (4) Date: Jun. 9, 2005

(87) PCT Pub. No.: WO2004/053782

PCT Pub. Date: Jun. 24, 2004

(65) Prior Publication Data

US 2006/0016275 A1 Jan. 26, 2006

(30) Foreign Application Priority Data

Dec. 12, 2002 (DK) ............................... 2002 01908

(51) Int. Cl.
*G01D 7/00* (2006.01)
(52) U.S. Cl. ................................. 73/862.042
(58) Field of Classification Search ............ 73/862.046, 73/862.042, 862.043
See application file for complete search history.

(56) References Cited

U.S. PATENT DOCUMENTS

| | | |
|---|---|---|
| 2,716,708 A | 8/1955 | Bradfield |
| 3,109,202 A | 11/1963 | Beckadolph et al. |
| 3,138,962 A | 6/1964 | Haines, Jr. et al. |
| 3,565,195 A * | 2/1971 | Miller et al. ............ 177/210 R |
| 3,753,294 A | 8/1973 | Attali et al. ................... 33/133 |

(Continued)

FOREIGN PATENT DOCUMENTS

DE 30 06 620 A1 9/1981

(Continued)

OTHER PUBLICATIONS

Publication "High-field electrostriction of elastomeric polymer dielectrics for actuation" by Roy Kornbluh, et al., SRI International; SPIE vol. 3669, pp. 149-161; Mar. 1999.

(Continued)

*Primary Examiner*—Edward Lefkowitz
*Assistant Examiner*—Octavia Davis
(74) *Attorney, Agent, or Firm*—McCormick, Paulding & Huber LLP

(57) ABSTRACT

A tactile sensor element includes a first pressure transfer layer and a second pressure transfer layer, an elastomeric body arranged between the first and second pressure transfer layers, the body having a first and a second surface opposed to each other, the first and second surfaces having corrugations to allow displacement of elastomeric body material in a predetermined direction perpendicular to the corrugations when exposed to a contact pressure on at least one of the surfaces, a first electrode arranged on the first surface and a second electrode arranged on the second surface, the first and the second electrodes being connectable to external means for determining the capacitance of a capacitor formed by the elastomeric body and the electrodes, where at least one pressure transfer layer has at least one portion of increased thickness. Further disclosed is a tactile sensor array comprising a plurality of sensor elements.

18 Claims, 3 Drawing Sheets

U.S. PATENT DOCUMENTS

| | | | |
|---|---|---|---|
| 3,875,481 A * | 4/1975 | Miller et al. | 361/283.1 |
| 4,266,263 A | 5/1981 | Haberl et al. | 361/283 |
| 4,330,730 A | 5/1982 | Kurz et al. | |
| 4,370,697 A * | 1/1983 | Haberl et al. | 361/283.1 |
| 4,376,302 A | 3/1983 | Miller | |
| 4,384,394 A | 5/1983 | Lemonon et al. | |
| 4,386,386 A | 5/1983 | Akita | 361/283 |
| 4,431,882 A | 2/1984 | Frame | 200/5 |
| 4,494,409 A | 1/1985 | Kondo et al. | 73/651 |
| 4,549,093 A * | 10/1985 | Severwright | 307/147 |
| 4,584,625 A | 4/1986 | Kellogg | 361/283 |
| 4,634,917 A | 1/1987 | Dvorsky et al. | 310/328 |
| 4,640,137 A * | 2/1987 | Trull et al. | 73/862.046 |
| 4,654,546 A | 3/1987 | Kirjavainen | 307/400 |
| 4,731,694 A | 3/1988 | Gräbner et al. | 361/280 |
| 4,825,116 A | 4/1989 | Itoh et al. | |
| 4,829,812 A | 5/1989 | Parks et al. | |
| 4,836,033 A | 6/1989 | Seitz | 73/862.04 |
| 4,852,443 A * | 8/1989 | Duncan et al. | 84/733 |
| 4,866,412 A * | 9/1989 | Rzepczynski | 338/114 |
| 4,879,698 A | 11/1989 | Langberg | |
| 4,986,136 A * | 1/1991 | Brunner et al. | 73/862.046 |
| 5,016,008 A | 5/1991 | Gruaz et al. | 341/33 |
| 5,028,876 A | 7/1991 | Cadwell | 324/678 |
| 5,060,527 A | 10/1991 | Burgess | 73/862.68 |
| 5,090,246 A * | 2/1992 | Colla et al. | 73/718 |
| 5,090,248 A | 2/1992 | Cimmino et al. | 73/780 |
| 5,115,680 A | 5/1992 | Lew | 73/763 |
| 5,172,024 A | 12/1992 | Broussoux et al. | |
| 5,173,162 A | 12/1992 | Hagimura et al. | 204/299 |
| 5,225,959 A | 7/1993 | Stearns | 361/283 |
| 5,255,972 A | 10/1993 | Shirasu | 60/528 |
| 5,259,099 A | 11/1993 | Banno et al. | |
| 5,300,813 A | 4/1994 | Joshi et al. | |
| 5,321,332 A | 6/1994 | Toda | |
| 5,410,210 A | 4/1995 | Sato et al. | 310/363 |
| 5,425,275 A | 6/1995 | Lockshaw | 73/775 |
| 5,447,076 A | 9/1995 | Ziegler | 73/862.626 |
| 5,449,002 A | 9/1995 | Goldman | 128/779 |
| 5,528,452 A | 6/1996 | Ko | 361/283.4 |
| 5,548,564 A * | 8/1996 | Smith | 367/140 |
| 5,642,015 A * | 6/1997 | Whitehead et al. | 310/309 |
| 5,755,090 A | 5/1998 | Hu | 60/39.091 |
| 5,755,909 A | 5/1998 | Gailus | |
| 5,760,530 A | 6/1998 | Kolesar | 310/339 |
| 5,841,143 A | 11/1998 | Tuma et al. | 250/458.1 |
| 5,977,685 A | 11/1999 | Kurita et al. | 310/311 |
| RE37,065 E | 2/2001 | Grahn | |
| 6,210,514 B1 | 4/2001 | Cheung et al. | 156/241 |
| 6,282,956 B1 | 9/2001 | Okada | 73/504.12 |
| 6,343,129 B1 | 1/2002 | Pelrine et al. | 381/191 |
| 6,376,971 B1 | 4/2002 | Pelrine et al. | 310/363 |
| 6,437,489 B1 | 8/2002 | Shinke et al. | |
| 6,543,110 B1 | 4/2003 | Pelrine et al. | 29/25.35 |
| 6,545,384 B1 | 4/2003 | Pelrine et al. | 310/309 |
| 6,545,395 B2 | 4/2003 | Matsui et al. | |
| 6,581,481 B1 | 6/2003 | Perusek | 73/862.337 |
| 6,583,533 B2 | 6/2003 | Pelrine et al. | 310/309 |
| 6,586,859 B2 | 7/2003 | Kornbluh et al. | 310/309 |
| 6,628,040 B2 | 9/2003 | Pelrine et al. | 310/307 |
| 6,662,658 B2 | 12/2003 | Foote | 73/514.29 |
| 6,664,718 B2 | 12/2003 | Pelrine et al. | 310/800 |
| 6,707,236 B2 | 3/2004 | Pelrine et al. | 310/800 |
| 6,768,246 B2 | 7/2004 | Pelrine et al. | 310/339 |
| 6,781,284 B1 | 8/2004 | Pelrine et al. | 310/330 |
| 6,806,621 B2 | 10/2004 | Heim et al. | 310/328 |
| 6,809,462 B2 | 10/2004 | Pelrine et al. | 310/800 |
| 6,812,624 B1 | 11/2004 | Pei et al. | 310/800 |
| 6,876,135 B2 | 4/2005 | Pelrine et al. | 310/339 |
| 6,882,086 B2 | 4/2005 | Kornbluh et al. | 310/328 |
| 6,891,317 B2 | 5/2005 | Pei et al. | 310/800 |
| 6,911,764 B2 | 6/2005 | Pelrine et al. | 310/328 |
| 6,940,211 B2 | 9/2005 | Pelrine et al. | 310/330 |
| 7,034,432 B1 | 4/2006 | Pelrine et al. | 310/309 |
| 7,049,732 B2 | 5/2006 | Pei et al. | 310/800 |
| 7,064,472 B2 | 6/2006 | Pelrine et al. | 310/324 |
| 7,104,146 B2 * | 9/2006 | Benslimane et al. | 73/862.626 |
| 7,211,937 B2 | 5/2007 | Kornbluh et al. | |
| 2001/0026165 A1 | 10/2001 | Pelrine et al. | 324/750 |
| 2001/0035723 A1 | 11/2001 | Pelrine et al. | 318/116 |
| 2002/0008445 A1 | 1/2002 | Pelrine et al. | 310/330 |
| 2002/0050768 A1 | 5/2002 | Beck et al. | 310/334 |
| 2002/0130673 A1 | 9/2002 | Pelrine et al. | 324/727 |
| 2002/0175594 A1 | 11/2002 | Kornbluh et al. | 310/317 |
| 2002/0175598 A1 | 11/2002 | Heim et al. | 310/328 |
| 2002/0185937 A1 | 12/2002 | Heim et al. | 310/339 |
| 2003/0006669 A1 | 1/2003 | Pei et al. | 310/309 |
| 2003/0066741 A1 | 4/2003 | Burgess et al. | 200/61.43 |
| 2003/0067245 A1 | 4/2003 | Pelrine et al. | 310/311 |
| 2003/0125781 A1 | 7/2003 | Dohno et al. | |
| 2003/0141473 A1 | 7/2003 | Pelrine et al. | 251/129.06 |
| 2003/0141787 A1 | 7/2003 | Pelrine et al. | 310/365 |
| 2003/0213960 A1 | 11/2003 | Kitagawa et al. | |
| 2003/0214199 A1 | 11/2003 | Heim et al. | 310/309 |
| 2004/0008853 A1 | 1/2004 | Pelrine et al. | 381/191 |
| 2004/0012301 A1 | 1/2004 | Benslimane et al. | 310/311 |
| 2004/0056567 A1 | 3/2004 | Menzel | |
| 2004/0124738 A1 | 7/2004 | Pelrine et al. | 310/307 |
| 2004/0217671 A1 | 11/2004 | Rosenthal et al. | 310/328 |
| 2004/0232807 A1 | 11/2004 | Pelrine et al. | 310/800 |
| 2004/0263028 A1 | 12/2004 | Pei et al. | 310/800 |
| 2005/0040736 A1 | 2/2005 | Topliss et al. | |
| 2005/0104145 A1 | 5/2005 | Benslimane et al. | |
| 2005/0157893 A1 | 7/2005 | Pelrine et al. | 381/190 |
| 2006/0066183 A1 | 3/2006 | Benslimand et al. | |
| 2006/0113878 A1 | 6/2006 | Pei et al. | 310/363 |
| 2006/0113880 A1 | 6/2006 | Pei et al. | 310/800 |
| 2006/0119225 A1 | 6/2006 | Heim et al. | 310/339 |
| 2006/0158065 A1 | 7/2006 | Pelrine et al. | 310/328 |
| 2007/0269585 A1 | 11/2007 | Benslimane et al. | |
| 2007/0277356 A1 | 12/2007 | Benslimane et al. | |

FOREIGN PATENT DOCUMENTS

| | | |
|---|---|---|
| DE | 30 23 218 A1 | 2/1982 |
| DE | 38 41 243 A1 | 6/1990 |
| DE | 198 26 391 A1 | 12/1999 |
| DE | 100 54 247 A1 | 5/2000 |
| DE | 200 04 248 U1 | 8/2000 |
| EP | 0 387 180 A1 | 9/1990 |
| EP | 0 855 307 B1 | 3/2003 |
| EP | 148 1738 A2 | 12/2004 |
| FR | 2 309 833 | 12/1976 |
| FR | 2 793 937 A1 | 11/2000 |
| JP | 55-42474 | 3/1980 |
| JP | 55-91299 | 7/1980 |
| JP | 1-273372 | 11/1989 |
| JP | 2002-237625 | 8/2003 |
| KR | 90-1465 | 3/1990 |
| WO | WO 96/34701 | 11/1996 |
| WO | WO 97/27822 | 8/1997 |
| WO | WO 00/66970 | 11/2000 |
| WO | WO 01/06575 A1 | 1/2001 |
| WO | WO 01/06579 A2 | 1/2001 |
| WO | WO 01/58973 A2 | 8/2001 |
| WO | WO 01/059852 A3 | 8/2001 |
| WO | WO 01/63738 A2 | 8/2001 |
| WO | WO 01/065615 A3 | 9/2001 |
| WO | WO 02/37660 A1 | 5/2002 |
| WO | WO 2004/079832 A2 | 9/2004 |
| WO | WO 2005/079187 A2 | 9/2005 |

| | | |
|---|---|---|
| WO | WO 2005/081676 A2 | 9/2005 |

OTHER PUBLICATIONS

Publication "Micro-Electro-Mechanical Systems (MEMS)—2000" by R. Trujillo, et al.; Presented at 2000 ASME International Mechanical Engineering Congress and Exposition, Nov. 5-10, 2000; Orlando, FL; pp. 709-716.

PCT Search Report for Serial No. PCT/DK03/00848 dated Mar. 25, 2004.

Article entitled "Electrostrictive Polymer Artificial Muscle Actuators" by R. Kornbluh, et al. Proceedings, 1998 IEEE International Conference on Robotics and Automation (CAT. No. 98CH36146), IEEE International Conference on Robotics and Automation, Leuven, Belgium, May 16-20, 1998; pp. 2147-2154, vol. 3, XP002269205, 1998.

PCT Search Report for Serial No. PCT/DK03/00603 dated Feb. 5, 2004.

Article entitled "Spontaneous formation of ordered structures in thin films of metals supported on an elastomeric polymer" by N. Bowden, et al., NATURE, vol. 393 dated May 14, 1998; pp. 146-149.

Article "Silicone Elastomers with Controlled Surface Composition Using Argon of Hydrogen Plasma Treatment" by B. Olander, et al., Journal of Applied Polymer Science, vol. 90, 2003 Wiley Periodicals, Inc.; pp. 1378-1383.

* cited by examiner

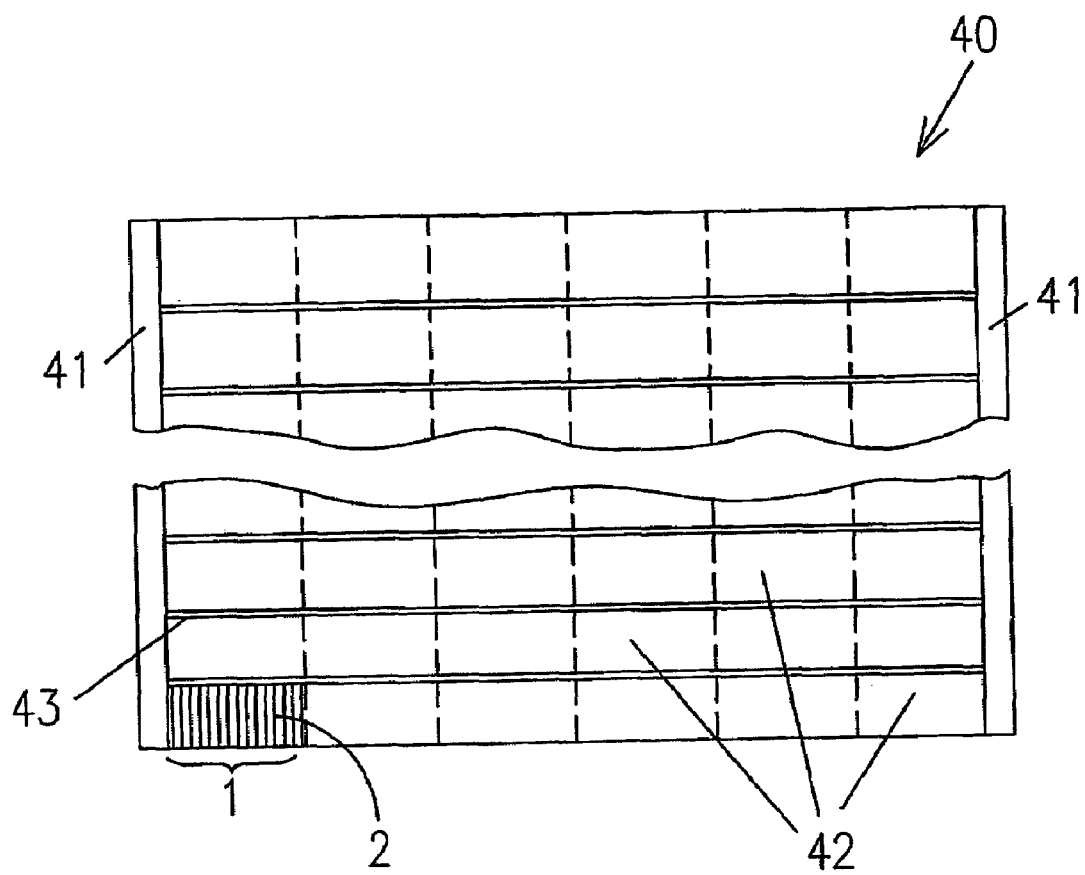
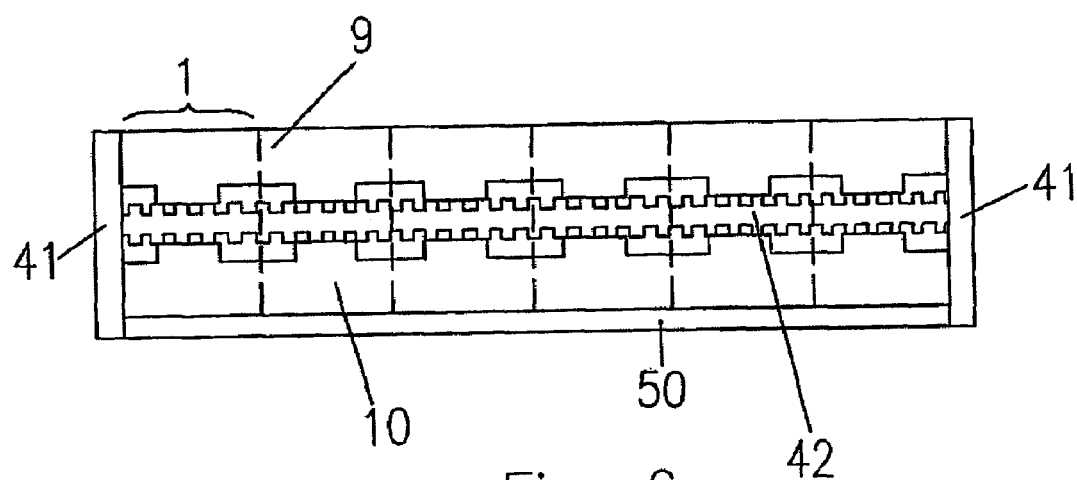
Fig. 5
Fig. 6

TACTILE SENSOR ELEMENT AND SENSOR ARRAY

CROSS REFERENCE TO RELATED APPLICATIONS

This application is entitled to the benefit of and incorporates by reference essential subject matter disclosed in international Patent Application No. PCT/DK2003/000848 filed on Dec. 10, 2003 and Danish Patent Application No. PA 2002 01908 filed on Dec. 12, 2002.

FIELD OF THE INVENTION

The invention relates to a sensor and, more particularly to a tactile sensor element for converting the pressure acting on a surface of a sensor into an electrical signal.

BACKGROUND OF THE INVENTION

Tactile sensor and tactile sensor arrays may be used in various applications to provide informations on the magnitude and the local distribution of pressure applied on a given surface area. As examples could be mentioned touch pads or drawing pads for character recognition in computer equipment, or contact pads for the determination and control of grip forces of a robotic gripping tool.

Such sensors widely known are using pressure sensitive devices based on piezo-resistive, piezo-electric or capacitive effects, and may be manufactured by thickfilm or thinfilm technologies, or using discrete elements. Miniaturization of such sensors is typically obtained by taking advantage of silicon micromachining processes. Common to these known sensors are relatively high costs for manufacturing and packaging.

SUMMARY OF THE INVENTION

It is an object of the invention to provide a novel tactile sensor element and a novel tactile sensor array, which are advantageous in regard of sensitivity, miniaturization, stability and manufacturing cost.

A tactile sensor element according to the invention comprises a first pressure transfer layer and a second pressure transfer layer, an elastomeric body arranged between the first and second pressure transfer layers, the body having a first and a second surface opposed to each other, the first and second surfaces having corrugations to allow displacement of elastomeric body material in a predetermined direction perpendicular to the corrugations when exposed to a contact pressure on at least one of the surfaces. The sensor element further comprises a first electrode arranged on the first surface and a second electrode arranged on the second surface, the first and the second electrodes being connectable to external means for determining the capacitance of a capacitor formed by the elastomeric body and the electrodes.

The corrugation of the surfaces of the elastomeric body with electrodes arranged on these surfaces ensure compliance of the electrodes in case of stretching the elastic body in a direction perpendicular to the corrugation. The electrodes can follow the geometric deformation without changing their electrical properties, and without detaching from the body surfaces or even breaking. Applying pressure to the pressure transfer layers leads to a decrease in thickness of the elastic body and to a decreased distance between the electrodes. The capacitance of a capacitor formed by the electrodes will thus be increased. Measurement of the capacitance by external equipment will provide information on the pressure acting on the surface of the tactile sensor element.

At least one portion of at least one pressure transfer layer has an increased thickness in relation to the other portions of the layer.

Hereby, the pressure acting on the tactile sensor element will be transferred to the elastomeric body by squeezing the body only in a region corresponding to the portion of increased thickness. On activation of the sensor, by pressing on the pressure transfer layer, the displaced material of the body is accommodated in the space formed between the thinner portions of the pressure transfer layer and the elastomeric body.

In a preferred embodiment, at least one pressure transfer layer has a central portion of increased thickness and, on each side of the central portion in the predetermined direction of extension of the body, an end portion of decreased thickness. Hereby, the tactile sensor element is divided into three sections, where the elastomeric body in a central section adjacent to the central portion of the pressure transfer layer will be squeezed and reduced in thickness. Body material from the central section will be pressed in a direction perpendicular to the corrugations towards the body sections adjacent to the end portions of the pressure transfer layer. The thinner transfer layer in these locations allows an increase in thickness of the body due to the body material displaced from the central section. However, it is important to note, that the overall longitudinal dimensions of the sensor element in the direction of extension will be substantially unchanged.

Preferably, the electrode on at least one of the surfaces comprises a first electrode portion adjacent to the central portion of the pressure transfer layer and second electrode portions adjacent to the end portions of the pressure transfer layer, the first and second electrode portions being isolated from each other. If pressure is applied to the sensor element, the first electrode portions covering the central section of the body form a first capacitor with increasing capacitance, while the second electrode portions form a second capacitor with decreasing capacitance. It is now possible to measure a differential capacitive signal as a function of pressure. This is advantageous to increase the sensor sensitivity and to eliminate measurement errors due to changing environmental conditions.

Preferably, the surface area of the first electrode portion is substantially equal to the total surface area of the second electrode portions. Hereby, the initial capacitance for both capacitors is substantially equal, which simplifies the determination of differential capacitance with the external electronic means.

Preferably, lateral means are provided on two opposed sides of the sensor element to prevent overall dimensional change of the sensor element in the predetermined direction. Hereby it is assured, that the force applied to the pressure transfer layer is utilized for displacement of the body material, which increases the sensitivity of the sensor element.

Preferably, the thickness of the pressure transfer layer is substantially equal to the thickness of the elastomeric body. Hereby, the body will be subjected to the major part of the pressure forces acting on the surfaces of pressure transfer layers.

Preferably, the elastomeric body and the pressure transfer layers have similar elastomeric properties. Hereby, and in combination with the high coefficient of friction between the electrodes and the pressure transfer layers, the elastic deformation of both the body and the pressure transfer layers, resulting from the pressure forces acting on the surfaces of the pressure transfer layers, can follow each other.

A tactile sensor array is disclosed, comprising a plurality of sensor elements, wherein the sensor elements are arranged in a row and column configuration for the determination of local pressure variations over the surface area of the sensor array, and wherein the plurality of sensor elements being integrally formed in a common elastomeric body member. A sensor array of this kind shows significant manufacturing cost advantages, as a large amount of sensor element bodies can be manufactured in a single process. High resolution tactile sensor arrays can be provided, where each sensor element presents a pixel-like element of the array.

Preferably, each row of sensor elements comprises an elongated common elastomeric body member, the body member constituting a continuous sequence of sensor element bodies.

Hereby, a row of sensor elements is provided on the basis of a single elongated elastomeric member with corrugated surfaces. Several rows are arranged to constitute a two-dimensional sensor array.

BRIEF DESCRIPTION OF THE DRAWINGS

In the following, the invention will be explained in more detail by means of embodiments and with reference to the accompanying drawings, in which FIG. 5 shows a top view of a tactile sensor array comprising a plurality of sensor elements of FIG. 3, and FIG. 6 shows a side view of the sensor array in FIG. 5.

DETAILED DESCRIPTION OF THE PREFERRED EMBODIMENTS

Figure 1:
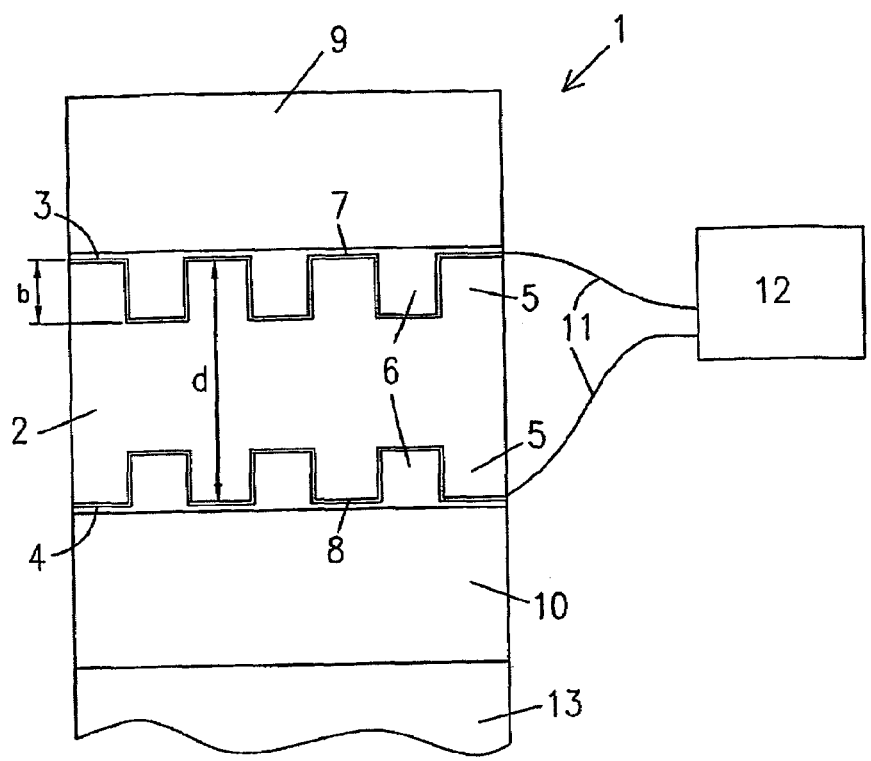
FIG. 1 shows a side view of a tactile sensor element with a pressure transfer layer of uniform thickness in unloaded state.

FIG. 1 shows a tactile sensor element 1 with an elastomeric body 2, preferably made of silicon rubber sheet material. The body has upper and lower surfaces 3 and 4, which have corrugations in the form of parallel ridges and grooves 5 and 6 running across the width of the body in a direction perpendicular to the drawing plane. The ridges and grooves are shown with square profiles, however, other profiles such as sinusoidal or rectangular may be applicable. The depth b of the grooves is typically in the range of 10 to 30% of the total thickness d of the body, which typically is 10 to 50 μm. As an example, the body has a thickness of 20 μm with corrugation depths of 5 μm.

Metal electrodes 7 and 8 are arranged on both upper and lower surfaces 3 and 4 by deposition of a thin uniform metal layer, such as gold, silver or copper, by use of suitable deposition technique. The electrodes are connected with lead wires 11 to external means 12 for measuring the capacitance of a capacitor formed by the electrodes. Interconnection between the electrodes and the lead wires is established by suitable bonding, welding or soldering technique. The thickness of the electrode layer is typically in the range of 20 to 100 nm.

The sensor element further comprises upper and lower pressure transfer layers 9 and 10 opposed to and covering the upper and lower surfaces of the body. The pressure transfer layers of this embodiment are made of elastomeric material having similar elastic properties as the body material. Typically, the thickness for the pressure transfer layers is in the same range as the thickness of the body. The lower pressure transfer layer 10 is in contact with a support body 13 to prevent relative movement between the support and the pressure transfer layer.

Figure 2:
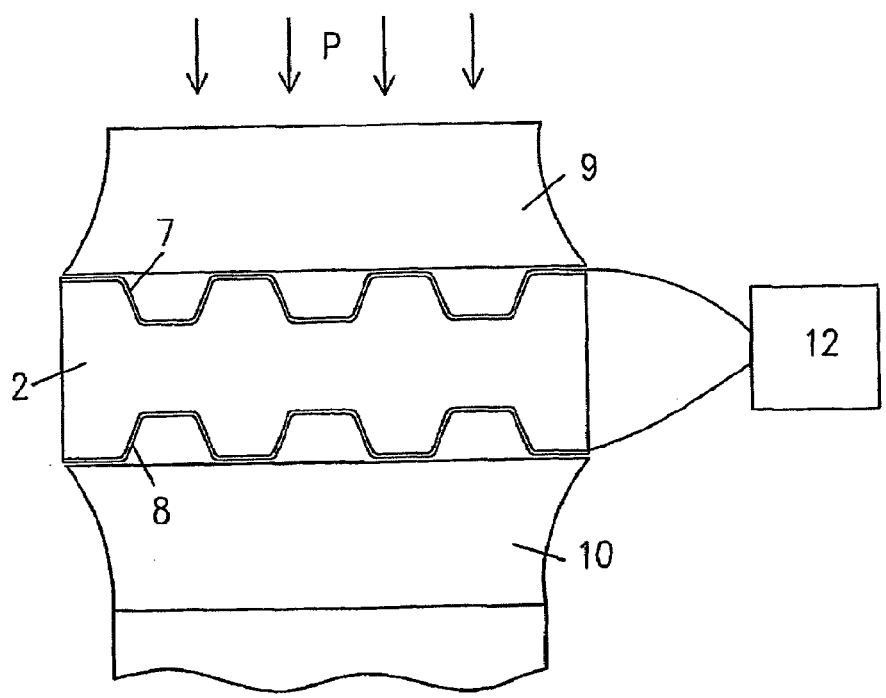
FIG. 2 shows a side view of the same sensor element in loaded state.

FIG. 2 shows the sensor element of FIG. 1 exposed to a pressure p on top of the upper pressure transfer layer 9. The pressure transfer layers are now brought into contact with the surfaces 3 and 4 of the elastomeric body, transferring the pressure to the body, which will be subjected to elastic deformation. Due to the corrugated structure of the body surfaces, the electrodes 7 and 8 deposited thereon are compliant in a longitudinal direction perpendicular to the ridges and grooves. Compliance of the electrodes in the direction of ridges and grooves is negligible due to the high elastic modulus of the electrode material. Thus, squeezing of the body leads to a reduction in thickness and to an elongation of the body in the longitudinal direction. The coefficient of friction between the electrodes and the material of the pressure transfer layer are sufficiently high to avoid relative movements between the body with the electrodes and the surface of the pressure transfer layers. Due to the similar elastomeric properties and thickness dimensions of pressure transfer layers 9, 10 and body 2, the elongation of the elastic pressure transfer layers and the body are thereby following each other. External means 12 will now measure an increased capacitance, as the distance between the electrodes is reduced. A linear relationship is achieved between the applied pressure and the measured capacitance change.

Figure 3:
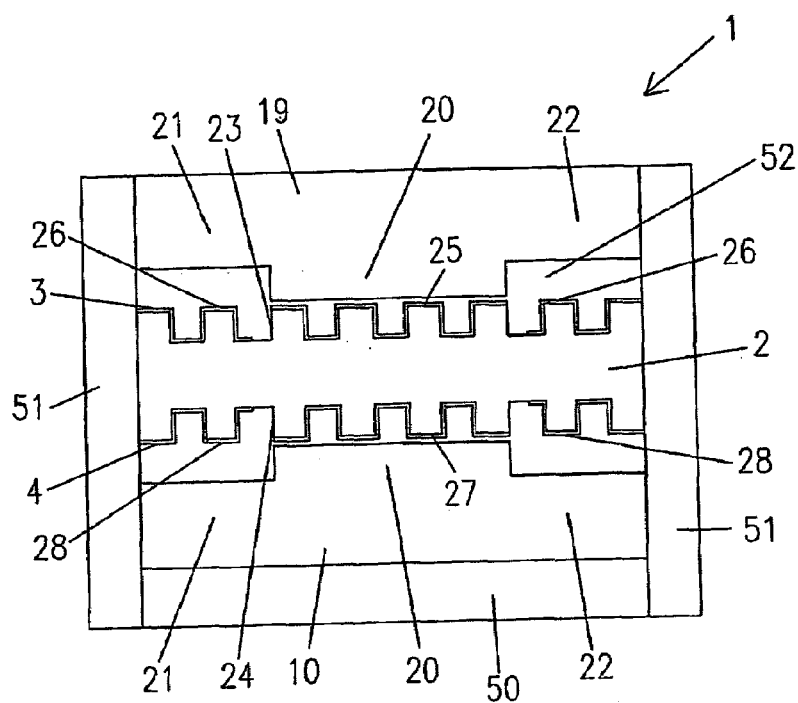
FIG. 3 shows a side view of a tactile sensor element with a pressure transfer layer having portions of increased and decreased thickness, in unloaded state.
Figure 4:
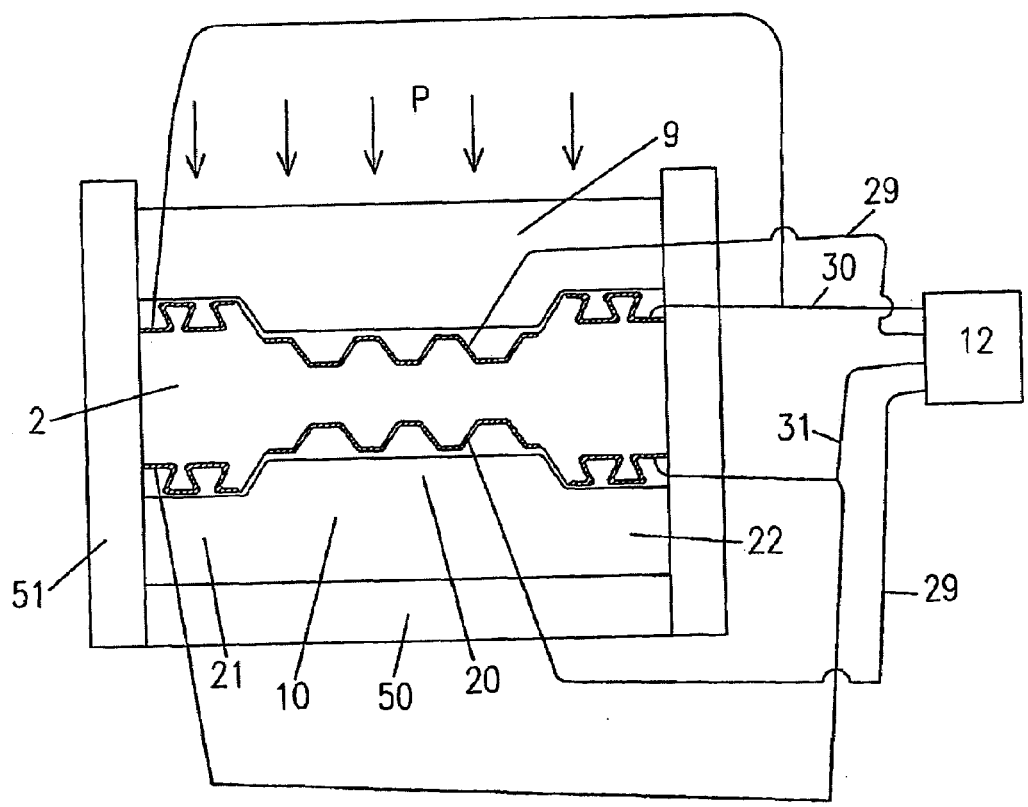
FIG. 4 shows a side view of the sensor element in FIG. 3 in loaded state.

A tactile sensor element according to the invention is shown in FIG. 3 in unloaded state and in FIG. 4 in loaded state. Each of the pressure transfer layers 9 and 10 now comprise a central portion 20 of increased thickness and end portions 21 and 22 of decreased thickness.

Between the pressure transfer layers is arranged an elastomeric body 2 with corrugated surfaces 3 and 4, having ridges and grooves extending perpendicular to the predetermined direction of extension of the body 2. The thickness of the central portion 20 of the pressure transfer layers 9, 10 is substantially equal to the thickness of the body 2. The first electrode deposited on the upper surface 3 of the body is divided into a first electrode portion 25, arranged adjacent to the central portion 20 of the pressure transfer layer 9, and into second electrode portions 26 arranged adjacent to the end portions 21 and 22 of the pressure transfer layer 9. In a similar manner, the second electrode deposited on the lower surface 4 of the body is divided into a first electrode section 27, arranged adjacent to central portion 20 of pressure transfer layer 10, and into second electrode portions 28 adjacent to the end portions 21 and 22 of pressure transfer layer 10. The electrode portions arranged on each surface of the body are isolated from each other, which results in three independent capacitors: a first capacitor formed by first electrode portions 25 and 27 and two capacitors, each of which is formed by a second electrode portion 26 and a second electrode portion 28. Surface portions 23 of surface 3 and surface portions 24 of surface 4 are not covered by electrode material.

The first electrode portions 25 and 27 are connected by lead wires 29 (se FIG. 4) to the external means 12 for determining the capacitance of the first capacitor. The second electrode portions 26 are connected to the external means through common lead wire 30, and second electrode portions 28 through common lead wire 31. Hereby, the capacitance of a common second capacitor formed by the second electrodes 26 and the second electrodes 28 can be measured.

To simplify wiring, all the electrode portions arranged on one surface of the elastomeric body could be interconnected to define a common ground electrode.

Second pressure transfer layer 10 is attached to a support body 50. Lateral means 51 for avoiding deformation of the sensor element in the longitudinal direction are arranged on both sides of the sensor element.

Spaces 52 between the pressure transfer layers and the body are evacuated. Alternatively, pressure equalizing means (not shown) may be provided between the spaces and the outside environment of the sensor element.

FIG. 4 shows the sensor element in loaded state, where a load is indicated as a pressure p acting on the upper surface of a relatively soft pressure transfer layer 9. The elastomeric body 2 is squeezed by the central portions 20 of the pressure transfer layers. Lateral means 51 prevent deformation of the sensor element in the longitudinal direction. Part of the material of the elastomeric body is being displaced in a direction perpendicular to the ridges and grooves formed in the surface of the body. Accordingly, the thickness of the elastomeric body decreases between the central portions 20, and the thickness of the body increases between the end portions 21 and 22 of the pressure transfer layers. The coefficient of friction between the electrodes and the surface of the pressure transfer layer is sufficiently high to avoid sliding movement of the ridges on the surface of the pressure transfer layer. Thereby, as it can be seen from FIG. 4, the corrugation pitch, represented by the longitudinal distance between adjacent ridges, has increased between the central portions of the pressure transfer layers, and has decreased between the end portions.

The capacitance of the first capacitor formed by the first electrode portions 25 and 27 has increased, while the capacitance of the capacitor formed by the second electrode portions 26 and 28 has decreased. A difference in capacitance in dependence of the applied pressure acting on the sensor element can be measured by the external means 12.

FIG. 5 shows a top view of a tactile sensor array 40 comprising plurality of sensor elements 1 according to FIG. 3 with the first pressure transfer layer 9 removed.

The array 40 comprises frame portions 41 and several elongated elastomeric body members 42 in the shape of rubber strips, each body member constituting a continuous row of sensor element bodies 2, illustrated by dashed lines. A spacing 43 is provided between adjacent rubber strips or adjacent rows of sensor elements to ensure independent actuation of the sensor elements. Lateral means 51 of the sensor element in FIG. 3 are also removed. Their lateral limiting function is now performed by the neighboring sensor elements within a row of sensors and by the frame 41.

The corrugation of the surface of the body members in the form of straight and parallel ridges and grooves extending along the width of the strips is only illustrated for a single sensor element body 2.

FIG. 6 shows a side view of the sensor array in FIG. 5, illustrating the realization of a plurality of sensor elements 1 in an elongated elastomeric body member 42. This is possible by the fact that, upon actuation of a single sensor element, displacement of elastomeric material is substantially limited to the region of this sensor element.

Depending on the intended application for a sensor array according to the invention, the dimensions for a single sensor element (pixel size) may vary from an upper range of several centimeters to a minimum of 100 µm. With a length of 200 µm and a width of 100 µm for a single sensor element 2, the length of the elastomeric body member 42 as shown in FIG. 6, which is constituted by six sensor elements, will be 1.2 mm. A square shape sensor array with a total area of 1.5 mm² would contain twelve body members, resulting in a number of pixels of 72. It can be understood, that high-resolution tactile sensor arrays can be realized even with limited overall dimensions.

The scope of the invention shall not be limited to elastomeric bodies having straight-line corrugations. Other corrugation shapes as concentric circles, squares or rectangles may be applicable as well.

While the present invention has been illustrated and described with respect to a particular embodiment thereof, it should be appreciated by those of ordinary skill in the art that various modifications to this invention may be made without departing from the spirit and scope of the present invention.

What is claimed is:

1. A tactile sensor element comprising:
   a first pressure transfer layer and a second pressure transfer layer;
   an elastomeric body arranged between the first and second pressure transfer layers, the body having a first surface and a second surface opposed to each other, the first and second surfaces having corrugations to allow displacement of elastomeric body material in a predetermined direction perpendicular to the corrugations when exposed to a contact pressure on at least one of the surfaces; and
   a first electrode arranged on the first surface and a second electrode arranged on the second surface;
   the first and the second electrodes being connectable to external means for determining the capacitance of a capacitor formed by the elastomeric body and the electrodes, wherein at least one pressure transfer layer has at least one portion of increased thickness.

2. The tactile sensor element according to claim 1, wherein at least one pressure transfer layer has a central portion of increased thickness and, on each side of the central portion in the predetermined direction of extension of the body, an end portion of decreased thickness.

3. The tactile sensor element according to claim 1, wherein the electrode on at least one of the surfaces comprise a first electrode portion adjacent to the central portion of the pressure transfer layer and second electrode portions adjacent to the end portions of the pressure transfer layer, the first and second electrode portions being isolated from each other.

4. The tactile sensor element according to claim 3, wherein the surface area of the first electrode portion is substantially equal to the total surface area of the second electrode portions.

5. The tactile-sensor element according to claim 1, wherein lateral means are provided on two opposite sides of the sensor element for preventing overall dimensional change of the sensor element in the predetermined direction.

6. The tactile sensor element according to claim 1, wherein the thickness of the pressure transfer layer is substantially equal to the thickness of the elastomeric body.

7. The tactile sensor element according to claim 1, wherein the elastomeric body and the pressure transfer layers have similar elastomeric properties.

8. The tactile sensor array comprising a plurality of sensor elements according to claim 1, wherein the sensor elements are arranged in a row and column configuration for the determination of local pressure variations over the surface area of the sensor array, and wherein the plurality of sensor elements being integrally formed in a common elastomeric body member.

9. The tactile sensor array according to claim 8, wherein each row of sensor elements comprises an elongated common elastomeric body member, the body member constituting a continuous sequence of sensor element bodies.

10. The tactile sensor array according to claim 9, wherein the elastomeric body member has corrugations extending perpendicular to the longitudinal direction of the elongated body member, and wherein adjacent body members are spaced from each other.

11. A tactile sensor array comprising:

a plurality of sensor elements arranged in a row and column configuration for the determination of local pressure variations over the surface area of the sensor array, and wherein the plurality of sensor elements being integrally formed in a common elastomeric body member;

wherein each of the sensor elements comprises a first pressure transfer layer and a second pressure transfer layer; an elastomeric body arranged between the first and second pressure transfer layers, the body having a first surface and a second surface opposed to each other, the first and second surfaces having corrugations to allow displacement of elastomeric body material in a predetermined direction perpendicular to the corrugations when exposed to a contact pressure on at least one of the surfaces; and a first electrode arranged on the first surface and a second electrode arranged on the second surface; the first and the second electrodes being connectable to external means for determining the capacitance of a capacitor formed by the elastomeric body and the electrodes, wherein at least one pressure transfer layer has at least one portion of increased thickness.

12. The tactile sensor array according to claim 11, wherein each row of sensor elements comprises an elongated common elastomeric body member, the body member constituting a continuous sequence of sensor element bodies.

13. The tactile sensor array according to claim 12, wherein the elastomeric body member has corrugations extending perpendicular to the longitudinal direction of the elongated body member, and wherein adjacent body members are spaced from each other.

14. The tactile sensor element according to claim 1, wherein the at least one portion of increased thickness comes into contact with the corrugations.

15. The tactile sensor element according to claim 1, wherein the at least one portion of increased thickness comes into contact with at least one of the electrodes.

16. The tactile sensor array according to claim 11, wherein the at least one portion of increased thickness comes into contact with the corrugations.

17. The tactile sensor array according to claim 11, wherein the at least one portion of increased thickness comes into contact with at least one of the electrodes.

18. A tactile sensor element comprising:

a first pressure transfer layer and a second pressure transfer layer;

an elastomeric body arranged between the first and second pressure transfer layers, the body having a first surface and a second surface opposed to each other, the first and second surfaces having corrugations to allow displacement of elastomeric body material in a predetermined direction perpendicular to the corrugations when exposed to a contact pressure on at least one of the surfaces; and a first electrode arranged on the first surface and a second electrode arranged on the second surface;

wherein the first and the second electrodes are connectable to external means for determining the capacitance of a capacitor formed by the elastomeric body and the electrodes;

wherein at least one pressure transfer layer has at least one portion of increased thickness; and wherein the electrode on at least one of the surfaces comprise a first electrode portion adjacent to the central portion of the pressure transfer layer and second electrode portions adjacent to the end portions of the pressure transfer layer, the first and second electrode portions being isolated from each other.

* * * * *